2,897,161

PROCESS FOR PREPARING COBALT-MOLYBDENUM-ALUMINA CATALYST

Henry Erickson, Park Forest, Ill., assignor to Sinclair Refining Company, New York, N.Y., a corporation of Maine No Drawing. Application April 16, 1957
Serial No. 653,055

3 Claims. (Cl. 252—465)

This invention relates to a method of increasing the crushing strength of calcined, extruded alumina based catalysts containing catalytically active metallic components.

Much work has been done with respect to catalysts to enhance their chemical and physical properties, the latter being of particular concern in petroleum refining processes wherein tons of catalytic material may be used in one unit. Generally this work has been directed toward methods of preparing the catalytic base, the chemical composition of the base, the choice of the catalytic promoting material and to various methods of impregnating the base with the active component with much less attention being focused on the physical aspects of the catalyst, e.g. its strength. Where a catalyst is to be utilized in a fixed or moving bed process, it is desirable that the catalyst be present in macrosized particles ranging from about $1/16''$ to $1/2''$ in diameter and about $1/16''$ to $1''$ or more in length. As a result of the relatively large size of these particles and the fact that the catalyst will be placed in the processing unit in dense, compact beds, large mechanical stresses are placed upon a given particle in the lower portion of the bed which can result in a crumbling or powdering of the catalytic particles. In a processing unit this crumbling or powdering is highly undesirable since the free space in the catalyst bed is decreased which increases the pressure drop on materials passing through the bed and may necessitate a shutdown of the processing unit. Weakness in the particles is due in part to cracks which occur as the result of the forming of the particles such as by extrusion, but other and more deleterious cracks are formed during the drying and calcination of the catalyst.

Several methods have been suggested for increasing the mechanical or physical strength of the catalytic particles, one such method being by tabletting small catalytic particles into the desired size and shape by pressing under high pressures. This results in a macrosize particle having a high degree of mechanical resistance. However, as a result of the high pressures employed in shaping the tablet its porosity can be greatly decreased resulting in particles of lower chemical activity apparently due to the lessened flow of fluid into and from the interior of the catalytic particle. The extrusion method of preparing macrosize particles results in a catalyst having sufficient porosity to be effective but having a tendency towards physical weaknesses causing breakage and degradation when placed under operating conditions. This is particularly true when low extrusion pressures are employed in order to provide particles of good porosity.

In accordance with this invention I have found that catalysts of the activated alumina base type having deposited thereon cobalt and molybdenum components, e.g. cobalt molybdate, as catalytically active materials can be greatly enhanced as to their mechanical or crush strength by contacting the calcined extruded catalyst with water in the liquid phase and recalcining the resultant catalyst. In addition to increasing the crush strength of the catalyst, this treatment does not unduly deleteriously affect the porosity or the surface area of the extruded catalyst. My method is particularly advantageous and economical in that good results can be obtained by contacting the catalyst with water in the liquid phase from which substantially all metals of the catalyst have been excluded. Thus, my method provides a means of physically strengthening the catalyst without materially changing any of the other final properties of the catalytic composition.

The length of time which the extruded, calcined catalyst remains in contact with the liquid phase water can be varied to an appreciable extent. However, it is preferred that the catalyst remain in contact with the water for at least about $1/2$ hour and preferably at least about 2 hours or longer prior to the recalcination step. The limits on the water contact time is a matter of choice but no advantage has been associated with periods over about a day. The water can be at any temperature and pressure sufficient to maintain the water in the liquid phase and preferably the temperature is from about 50 to 200° F. and the pressure about atmospheric. The temperatures of the drying and recalcination steps before and after the water treatment can also vary over a wide range as used in the art. For instance, the drying step is generally conducted at temperatures ranging from about 200 to 450° F. while calcination is usually effected at about 750 to 1300° F. or more.

In carrying out my method of catalytic treatment the alumina hydrate from which the catalyst is prepared can be any of the known hydrates such as the monohydrate, boehmite; the trihydrates, bayerite-I, bayerite-II (randromite) and gibbsite; or another hydrous alumina which appears to be amorphous. It is preferred, however, that the alumina hydrate contain about 10–90 weight percent of trihydrate, preferably about 10 to 50 weight percent with substantially the remainder being monohydrate, amorphous or mixtures of these forms. The alumina hydrate can contain other materials such as silica and can be prepared by any of the conventional methods. For example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions and as the concentrations of these electrolytes decrease, the alumina monohydrate and amorphous forms will convert to the alumina trihydrate. This conversion can be stopped by drying the alumina material thus forming a mixture of alumina trihydrate and alumina monohydrate and/or amorphous forms.

The alumina hydrate can be in the form of dried or undried alumina hydrate or alumina hydrogel in gelatinous form dried sufficiently to afford discrete particles. However, finely divided particles such as spray dried microspheres are preferred as they present large surface areas for the deposition of the catalytically active components. The total amounts of cobalt and molybdenum components can vary considerably while being sufficient to afford a substantial catalytic effect. In general, the amount of these metal components present is a minor portion of the catalyst and may be as low as 0.1 weight percent of the finished catalyst. Usually the total active metal components can comprise from about 0.1 to 30 weight percent of the catalyst and each component is at least about 0.05 weight percent of the finished catalyst. The individual metallic components will generally be about 1 to 5 percent of the cobalt component and about 5 to 25 percent of the molybdenum component. All of these percentages are calculated as weight percent of the finished catalyst on a metal oxide basis.

The cobalt and molybdenum components can be added to the alumina hydrate by any procedure desired and it is preferred that they be incorporated into the alumina while the latter is in the hydrated state before extrusion, usually being in powdered or small particle form, e.g. below about 50 to 100 mesh. Advantageously, the catalyst which is to be treated in accordance with the present invention can be prepared by agitating the substantially water-insoluble inorganic compounds of the catalytically active metals in an aqueous medium with a spray dried alumina hydrate base precursor for a time sufficient to effect disposition on the alumina base of an amount of metal component which affords a substantial catalytic effect. The time necessary to give this result can depend upon the material being deposited as well as the conditions of agitation such as the temperature at which the slurry is digested and in general will be at least about ten minutes. While the slurry is digesting, it is stirred and preferably is at a temperature from about 125° F. to about 190° F. or to about 212° F. Higher temperatures even above 212° F. could be employed, however, no particular advantage is associated with their utilization which overcomes the necessity for employing superatmospheric pressure to maintain the slurry by keeping the water in the liquid phase. Lower temperature such as room temperature and somewhat below can also be employed. For instance, cobalt and molybdenum are effectively deposited on the alumina base when cobalt carbonate, molybdenum trioxide and the alumina hydrate base are digested at room temperature in the aqueous slurry with agitation for about six hours. After the slurry has been digested for the necessary time period it is filtered to obtain the solids which are extruded into the desired shape and size and subsequently dried, calcined and then treated in accordance with the present invention.

The following example will illustrate a typical preparation of the catalyst to be treated in accordance with my invention. However, it should not be considered as limiting the scope of my invention.

EXAMPLE I

An aqueous slurry having a concentration of about 6 percent alumina hydrate of which approximately 20 percent is alumina trihydrate, the remainder being monohydrate or amorphous (all as detected by X-ray diffraction of dried samples) is pumped with a high pressure pump into a spray drier and atomized at a pressure of 900 to 1000 pounds per square inch in an atomizer of hot air having an inlet temperature of 1000 to 1100° F. The particle temperature is approximately 260° F., and the resultant microspherical particles run approximately 50 percent by weight above 200 mesh and 50 percent by weight below 200 mesh. The dry material is collected for the next step of the process. This material contains about 10 to 15% of free water and about 25 to 30% of total water (free water plus water of crystallization).

1500 pounds of the dried alumina hydrate microspherical particles prepared as above described are added to 527 gallons of water, heated to 180° F. and agitation is begun. 175 pounds of pure molybdic oxide is slurried in 15 to 20 gallons of water and added to the alumina hydrate-water mixture previously prepared. 107 pounds of cobalt carbonate are slurried with 15 to 20 gallons of water and added to the alumina hydrate-water mixture. Agitation of the slurry at a temperature of 180° F. is continued for one hour.

The resultant mixture is pumped to a filter and filtered as fast as possible, at the same time maintaining the filter cake as thick as possible. The filter cake is transferred into a flash drier where dispersed falling hydrate particles are contacted with a hot gas stream, the outlet temperature of which is maintained at 200 to 250° F. to produce a material containing about 25 percent of total water and about 5 to 10 percent of free water. The material is discharged from the flash drier into a hammer mill which grinds any hard particles. The dried impregnated material is passed to storage preparatory to using it in the next step of the process.

250 pounds of the dried impregnated material containing about 5 to 10 percent of free moisture is mixed in a blender with 17.2 gallons of water for about 10 to 20 minutes at about 60 to 80° F. The moisture content is adjusted to about 33 percent by weight of free water by adding a small amount of previously dried impregnated material or fines obtained from a previous extrusion.

The impregnated alumina hydrate containing about 33 per cent by weight of free moisture is passed through a pellet extrusion mill to produce finished pellets approximately 1/8" in diameter and 1/8" to 1/4" long. The finished pellets are discharged directly into a second pellet mill designed to produce pellets having approximately the same size. This results in greater compression of the pellets and consequently higher strength. The material from the second pellet mill is discharged into a screener which removes the fines. The latter are recycled to the blender to be used in making up the mixture to be extruded. The pellets which now contain about 27 to 29 percent of free water are ready for drying, screening and calcining.

The extruded pellets are predried at a temperature of 250° F. until the free moisture content is reduced to less than 5 percent by weight. They are then screened again to remove fines which are recycled back to the blender. The screened pellets are fed directly into a calciner maintained at a temperature of 1050 to 1150° F. The calcined pellets are ready for use in catalytic operations.

These pellets have a bulk density of about 47 pounds per cubic foot, are blue in color, and have a hardness corresponding to a 15 pound crush (longitudinal) per 1/8" length. The amount of cobalt plus $MoO_3$ corresponds to about 11 to 12 percent by weight of the resultant catalyst.

The following data illustrate the improvement which can be realized by treating either a virgin or a regenerated cobalt-molybdenum catalyst by my method. The regenerated catalyst was obtained by using the virgin catalyst to desulfurize a petroleum light cycle oil and the carbon deposited on the catalyst during processing was reduced to 0.01 percent by burning in an oxygen-containing gaseous stream.

Three catalysts were prepared by a process essentially as described in Example I and were designated A, B and C having crushing strengths of 15.6, 10.5 and 10.8 (lbs. per 1/8" length), respectively.

The following table shows the improvement in each of these catalysts when treated in accordance with the present invention. Unless otherwise specified in the table, the catalysts were recalcined for 2½ hours in air at about 1050° F.

Table 1

IMPROVEMENT OF CATALYST CRUSHING STRENGTH

| | Crush lbs. per 1/8" length | | |
|---|---|---|---|
| | A | B | C |
| Recalcined 16 hrs. in air at 1150° F | | 13.7 | 14.6 |
| Recalcined 2½ hrs. in air at 1050° F | | 13.7 | 14.6 |
| Soaked ½ hr. in water and recalcined | | 16.2 | 12.6 |
| Soaked 2 hrs. in water and recalcined | | 16.2 | 12.5 |
| Soaked 95 hrs. in water and recalcined | 18.9 | | |
| Soaked ½ hr. in 1% Igepal CO and recalcined | | 17.8 | 15.9 |

Catalyst A before treatment had an area of 252 m.²/gm. and a total pour volume of 0.533 cc./gm. The same catalyst had an area of 239 m.²/gm. and a total pour volume of 0.547 cc./gm. after soaking in water for 95 hours with subsequent drying and recalcination at about 1050° F. No differences were noted in its catalytic activitiy or aging rate in desulfurizing petroleum hydrocarbons. Very little, if any, changes were noted in the other properties of the catalysts. If desired, the beneficial effect as to catalyst particle strength can be gained by cooling the extruded calcined catalyst with moist air across the catalyst and then drying and recalcining the thus moistened catalyst. If desired, the distinct drying step after the water contact and prior to the recalcination can be omitted.

In some cases when it is desirable to obtain the maximum increase in crush strength it may be found necessary to add a surfactant to the water, the purpose of the surfactant being to reduce the surface tension of the catalyst so that the water will more completely wet its surface. The surfactant is generally employed in amounts not to exceed one weight percent. Ordinarily, however, about 0.1 to 0.5 weight percent is sufficient. Useful surfactants, not to be considered as inclusive can be enumerated as follows: dioctyl sodium sulfosuccinate, diamylphenolethoxy polymer and para-iso-octylethoxy polymer, the last-named being used in the above example and designated as Igepal CO.

A cobalt-molybdena catalyst prepared essentially as described in Example I was utilized in a fluid catalytic desulfurization unit in the presence of free hydrogen having as a feed stock a fluid light cycle oil. After the catalyst had gained an appreciable coke content, it was removed from the system and the coke burned off. This regenerated catalyst was found to possess a crush strength of about 6.1 pounds per 1/8" length. A portion of this regenerated catalyst was calcined for about 2½ hours at 1050° F. and a slight improvement of crush strength was noted, i.e. to 9.3 pounds per 1/8" length. Another sample of the same catalyst was soaked in water for 2 hours, drained, oven dried at about 300° F. and recalcined for about 2½ hours at 1050° F. A crush strength of 12.7 pounds per 1/8" length was noted in the catalyst when treated in this manner.

Thus, it can be seen that a calcined extruded catalyst either virgin or regenerated having a low crush strength can be improved as to this characteristic by treatment in accordance with my process thereby effectively saving large amounts of catalyst which may have been useless.

I claim:
1. In a method of increasing the crushing strength of calcined extruded catalyst consisting essentially of a major portion of an activated alumina and minor but effective portions of cobalt and molybdenum, the steps which comprise soaking said calcined catalyst with water in the liquid phase for a time sufficient to provide catalyst particles of increased strength upon recalcination and calcining the thus treated catalyst.

2. The method of claim 1 wherein the alumina hydrate precursor for the activated alumina consists essentially of about 10 to 50 weight percent alumina trihydrate.

3. In a method of making catalysts the steps comprising spray drying an alumina hydrate aqueous slurry in which the hydrate is about 10 to 50% trihydrate, agitating the spray dried alumina hydrate in an aqueous slurry containing inorganic, substantially water-insoluble compounds of cobalt and molybdenum for a time sufficient to deposit catalytic amounts of cobalt and molybdenum on the alumina hydrate, filtering the slurry to obtain the solids, extruding the solids to obtain macro-size particles, calcining the extruded particles, soaking the calcined particles with water for a time sufficient to provide catalyst particles of increased strength upon recalcination and recalcining the thus treated catalyst particles.

References Cited in the file of this patent

UNITED STATES PATENTS

| | | |
|---|---|---|
| 1,868,581 | Miller | July 26, 1932 |
| 2,412,600 | Burk et al. | Dec. 17, 1946 |
| 2,487,466 | Nahin | Nov. 8, 1949 |
| 2,669,547 | Shabaker | Feb. 16, 1954 |
| 2,774,743 | Hockstra | Dec. 18, 1956 |